United States Patent [19]

Dawson

[11] Patent Number: 4,477,633
[45] Date of Patent: Oct. 16, 1984

[54] SIMULTANEOUSLY CHLORINATING AND GRAFTING A CURE SITE ONTO POLYETHYLENE IN AN AQUEOUS SUSPENSION

[75] Inventor: Robert L. Dawson, Wilmington, Del.

[73] Assignee: E. I. DuPont de Nemours and Company, Wilmington, Del.

[21] Appl. No.: 561,523

[22] Filed: Dec. 15, 1983

[51] Int. Cl.$^3$ ............................................. C08F 8/46
[52] U.S. Cl. ................................... 525/292; 525/301; 525/356
[58] Field of Search ................................ 525/292, 301

[56] References Cited

U.S. PATENT DOCUMENTS

| | | | |
|---|---|---|---|
| 3,563,974 | 2/1971 | Eckardt et al. | 260/94.9 |
| 3,594,451 | 7/1971 | Keown | 260/878 |
| 3,646,165 | 2/1972 | Favie et al. | 525/301 |
| 3,928,497 | 12/1975 | Ohmori et al. | 525/301 |
| 3,932,368 | 1/1976 | McConnell et al. | 525/301 |
| 4,376,855 | 3/1983 | Ames | 525/301 |

FOREIGN PATENT DOCUMENTS 130254 4/1973 India .
51-42794 4/1976 Japan .
773922 5/1957 United Kingdom .

Primary Examiner—Joseph L. Schofer
Assistant Examiner—Bernard Lipman

[57] ABSTRACT

A chlorinated polyethylene elastomer is made by mixing polyethylene with water to form an aqueous suspension of the polyethylene and simultaneously chlorinating and grafting a cure site on the polyethylene by mixing and heating the aqueous suspension containing a free radical initiator, gaseous chlorine and about 0.1–1.5 moles per kg of polyethylene of an alkyl or alkylaryl monester of butenedioic acid having the formulas

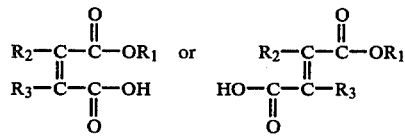

or mixtures thereof, where $R_1$ is an alkyl or alkylaryl group having from about 8–20 carbon atoms and $R_2$ and $R_3$ are hydrogen, chlorine or an alkyl group having from about 1–4 carbon atoms.

9 Claims, No Drawings

SIMULTANEOUSLY CHLORINATING AND GRAFTING A CURE SITE ONTO POLYETHYLENE IN AN AQUEOUS SUSPENSION

BACKGROUND OF THE INVENTION

This invention relates to a process for chlorinating polyethylene in aqueous suspension while simultaneously grafting a cure site monomer onto the polymer backbone.

When polyethylene is chlorinated, the crystalline thermoplastic starting material is converted to an amorphous chlorinated elastomeric polyolefin. The resultant product can then be cured to give useful products which are resistant to ozone, oxidizing chemicals, light and heat. Such curing is usually carried out by highly reactive reagents, especially peroxides. Due to the inherently nondiscriminating nature of peroxide curatives, various customary additives, for example, certain fillers, such as acid clays and silicas, and plasticizers cannot be incorporated in the compounded polymer. Also, peroxides are hazardous to handle and they have a deleterious effect on commonly used antioxidants and processing oils. It is generally more desirable to incorporate cure sites on the polymer molecule which permit the curing reaction to take place under milder conditions and with a wider choice of curing conditions and compounding ingredients. Such reactive cure sites can be incorporated into chlorinated polyethylene by the chlorosulfonation reaction disclosed in, for example, U.S. Pat. No. 3,299,014 or by grafting maleic acid derivatives onto polyethylene during chlorination as described in, for example, British Pat. No. 773,922. However, these processes must be carried out in organic solvents, such as carbon tetrachloride, which presents disposal and environmental pollution problems. Substitution of an aqueous medium for an organic solvent medium has not been possible due to the solubility of the reagents in water or reactivity of the reagents with water.

The present invention provides a process for making a chlorinated polyethylene elastomer having cure sites on the polymer that are derived from alkyl or alkylaryl monoesters of butenedioic acid by simultaneous chlorination and grafting reactions in an aqueous suspension. The resulting chlorinated polyethylene elastomer that has cure sites grafted onto the polymer backbone can be cured with polyepoxides, polyamine compounds and polyamine generators to give a product which exhibits the desirable properties associated with peroxide cured chlorinated polyethylene elastomers.

SUMMARY OF THE INVENTION

The present invention relates to a process for preparing a curable chlorinated polyethylene elastomer which comprises mixing finely divided polyethylene with water sufficient to form an aqueous suspension of the polyethylene and simultaneously chlorinating the polyethylene and grafting a cure site onto the polyethylene backbone by mixing and heating the aqueous suspension containing a free radical initiator, gaseous chlorine and about 0.1–1.5 moles per kilogram of polyethylene of an alkyl or alkylaryl monoester of butenedioic acid having the formulas

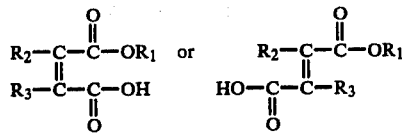

or mixtures thereof, where $R_1$ is an alkyl or alkylaryl group having from about 8–20 carbon atoms and $R_2$ and $R_3$ are hydrogen, chlorine or an alkyl group having from about 1–4 carbon atoms to provide a cure site on the resulting chlorinated polyethylene elastomer.

The resulting chlorinated polyethylene elastomer contains from about 20 to 45 weight percent chlorine and from about 0.1–1.0 moles per kg of polyethylene of units grafted on the polymer that are derived from the alkyl or alkylaryl monoesters of butenedioic acid described above.

DETAILED DESCRIPTION OF THE INVENTION

The chlorination and grafting reactions of the present invention take place simultaneously in an aqeuous suspension medium on a polyethylene substrate. Sufficient water is present to make a suspension of polyethylene that can be easily agitated or stirred. The polyethylene, in finely divided form, for example, having a particle size less than about 50 mesh or preferably in powdered form, is present at a concentration usually from about 4 to 50 percent by weight, preferably 15-30 percent by weight, of the suspension. Any polyethylene can be utilized in the process of this invention, such as linear high density polyethylene, or low density, branched polyethylene. The polyethylene should have a sufficiently high weight average molecular weight, e.g., at least about 20,000, preferably at least about 50,000, to yield an elastomeric material having high tensile strength upon chlorination. The term "polyethylene" as used herein is also intended to include polymers of ethylene containing minor amounts, i.e., up to 15 weight percent, of other ethylenically unsaturated monomers copolymerizable therewith, especially other lower alkenes such as propylene or butene-1, octene, or other low molecular weight alkenes or other monomers such as acrylic or methacrylic acids. The polyethylene used in the process may be ground or precipitated, for example, by the addition of isopropyl alcohol to a hot solution of the polymer in toluene.

The alkyl or alkylaryl monoesters of butenedioic acid have the formulas

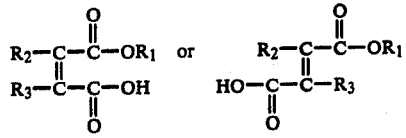

or mixtures thereof, where $R_1$ is an alkyl or alkylaryl group having from about 8–20 carbon atoms and $R_2$ and $R_3$ are hydrogen, chlorine or an alkyl group having from about 1–4 carbon atoms. Preferably, $R_1$ is an alkyl or aralkyl group containing 10–16 carbon atoms. The surfactant properties of the monoesters of butenedioic acid aid the suspension of the polyethylene in the aqueous medium, especially those having at least 10 carbon atoms. The monoesters of butenedioic acid are added to the aqueous suspension at a concentration of from about 0.1–1.5 moles per kg of polyethylene, preferably from about 0.3–0.9 moles per kg of polyethylene.

It has been found that the alkyl or alkylaryl groups of the monoesters of butenedioic acid must contain at least about 8 carbon atoms in order for the grafting reaction to occur on the polyethylene in the aqueous suspension. Following the process of this invention sufficient amounts of cure sites of from about 0.1–1.0 moles per kg of chlorinated polyethylene, usually, from about 0.2–0.6 moles per kg of chlorinated polyethylene are grafted onto the polyethylene backbone to render it curable by polyepoxides and polyamines. Representative alkyl or alkylaryl monoesters of butenedioic acid that can be used in the process of the invention include hexadecyl hydrogen maleate, hexadecyl hydrogen fumarate, octyl hydrogen maleate, oleyl hydrogen maleate, hexylbenzyl hydrogen maleate and nonylphenyl hydrogen fumarate, decyl hydrogen citraconate, octyl hydrogen itaconate, the mono-2-ethyl hexyl ester of 2-methylbutenedioic acid, and the mono-4-ethylphenyl ester of 2-chloro- butenedioic acid. Monomers such as maleic anhydride and maleic acid monomethyl ester do not graft onto polyethylene in aqueous suspension because of the degree of water solubility and their reactivity with water.

Chlorination of the finely divided polyethylene substrate takes place in the usual manner through reaction of gaseous chlorine with the polyethylene. Generally, about 40 to 200 parts chlorine per 100 parts by weight of polyethylene is added, usually in the form of chlorine gas, to the aqueous suspension.

A conventional free radical initiator is present during the chlorination and grafting reaction thus aiding in the production of active cure sites on the polyethylene. Generally, the free radical initiator is added to the reaction mixture in amounts of about 0.1–1 percent by weight based on the polyethylene. Typical of such free radical initiators are azobis(cyanoalkanes) such as 2,2'-azobis(isobutyronitrile), 1,1'-azo-dicyclohexanecarbonitrile, and 2,2'-hydroxyethylazo-2,4-dimethylvaleronitrile, organic peroxides such as benzoyl peroxide, lauroyl peroxide and ditertiarybutyl peroxide. Other conventional free radical initiators used in the manufacture of chlorinated polyethylene that can be used in the process of this invention are described in, for example, U.S. Pat. Nos. 2,503,252 and 2,640,048.

In the operation of the process of this invention it is often desirable, but not necessary, to add a dispersing agent to the aqueous suspension of finely divided polyethylene in order to assure that the suspension of polyethylene and the resulting chlorinated polyethylene remain free of agglomeration. Representative examples of such dispersing agents include polyvinyl alcohol, carboxymethyl cellulose, and the sodium salt of a condensed mono naphthalene sulfonic acid. The dispersing agents are added to the reaction mixture in an amount of about 0.1 to 1.0 percent by weight based on the polyethylene.

The simultaneous chlorinating and grafting reaction of the present invention, which typically takes from about 1–3 hours, is conducted at a temperature of from about 70°–130° C., usually about 85°–105° C. while the suspension of polyethylene is agitated.

Other conventional ingredients such as inorganic or organic accelerators and activators, fillers, including acid clays and silicas, plasticizers, pigments, antiozonants and the like frequently added to chlorinated polyethylene elastomers can be conveniently incorporated in the elastomer composition of the present invention during compounding.

The chlorinated polyethylene elastomers containing units derived from monoesters of butenedioic acid can be crosslinked or vulcanized. Crosslinking takes place by reaction at the grafted cure site with curatives such as polyepoxides, polyamine compounds, or polyamine generators. Optionally, these curing reactions can be accelerated with amine generators such as N-phenyl-N',N'-dimethyl urea or a guanidine accelerator such as diphenyl guanidine. These cures are carried out on the compounded polymer at about 100°–175° C., usually at 150°–160° C., for 5–45 minutes. In addition, the chlorinated polyethylene may also be cured with peroxides or sulfur but these curing agents are not preferred due to reasons mentioned above, and polymer discoloration occurs from sulfur cure systems.

The grafted chlorinated polyethylene elastomers of this invention are used in applications where conventional chlorinated polyethylene elastomers are used in the vulcanized or cured state. Exemplary uses are in extruded goods, such as hoses, seals, film, wire and cable covers and the like.

The invention will now be described in connection with the following example wherein parts and percentages are by weight unless otherwise specified.

EXAMPLE

In a flask equipped with a mechanical stirrer a solution of 0.4 g polyvinyl alcohol in 1200 ml of water was prepared. To this solution was added 60 g of finely divided polyethylene having a weight average molecular weight of about 100,000 and 17 g of hexadecyl hydrogen monomaleate (about 0.83 moles per kg of polyethylene). The resulting suspension was stirred, heated to 85° C. and 0.3 g of benzoyl peroxide was added to the aqueous suspension of polyethylene. Heating at this temperature and stirring was continued for 2 hours. During this time, chlorine gas was added to the aqueous suspension of polyethylene at an average rate of 0.2 l/min. The reaction mixture was cooled to about room temperature, and the product was isolated by filtration. The chlorinated polyethylene was washed with water and a sodium bicarbonate solution and then dried under vacuum. A 97.5 g sample of white granules containing 28% chlorine was obtained. The infra-red spectrum of the chlorinated polyethylene shows a strong carbonyl band at 1700 cm$^{-1}$, indicating incorporation of the maleic ester onto the polyethylene backbone. The infrared absorbance is not removed by extracting the polymer with acetone.

A cured sample of the grafted chlorinated polyethylene was prepared from the polymer using a diepoxide as curative and a substituted urea as accelerator. The ingredients shown in the Table were compounded on a rubber mill. Samples were cured at 320° F. (160° C.) for 30 minutes and tested according to standard ASTM methods indicated below.

TABLE

|  | Parts by Weight |
|---|---|
| Chlorinated polyethylene | 66 |
| SRF Carbon Black | 26 |
| TLD-90 (90% PbO, 10% EPDM rubber) | 14.5 |
| MgO | 6.6 |
| Epon 828 polyepoxide* | 6.3 |
| N'—phenyl-N',N'—dimethyl urea | 0.9 |
| Stress/Strain | |

TABLE-continued

|  | Parts by Weight |
| --- | --- |
| $T_B$ (MPa)[1] | 16.2 |
| $E_B$ (%)[1] | 80 |
| Permanent Set (%)[1] | 17 |
| Compression Set[2] (70 hrs/100° C.) | 89 |

[1]ASTM D-412
[2]ASTM D-395
*4,4'isopropylidenediphenol-epichlorohydrin resin

I claim:

1. A process for preparing a curable chlorinated polyethylene elastomer which comprises mixing finely divided polyethylene with water sufficient to form an aqueous suspension of the polyethylene and simultaneously chlorinating the polyethylene and grafting a cure site onto the polyethylene backbone by mixing and heating the aqueous suspension containing a free radical initiator, gaseous chlorine and about 0.1–1.5 moles per kg of polyethylene of an alkyl or alkylaryl monoester of butenedioic acid having the formulas $$R_2-\overset{O}{\underset{\phantom{O}}{C}}-\overset{\phantom{|}}{C}-OR_1 \quad \text{or} \quad R_2-\overset{O}{\underset{\phantom{O}}{C}}-\overset{\phantom{|}}{C}-OR_1$$
$$R_3-\overset{\phantom{|}}{C}-\overset{O}{\underset{\phantom{O}}{C}}-OH \quad\quad HO-\overset{\phantom{|}}{C}-\overset{O}{\underset{\phantom{O}}{C}}-R_3$$

or mixtures thereof, where $R_1$ is an alkyl or alkylaryl group having from about 8–20 carbon atoms and $R_2$ and $R_3$ are hydrogen, chlorine or an alkyl group having from about 1–4 carbon atoms to provide a cure site on the resulting chlorinated polyethylene elastomer.

2. A process of claim 1 where $R_1$ is an alkyl group.

3. A process of claim 1 where 0.3–0.9 moles per kg of polyethylene are added to the aqueous suspension.

4. A process of claim 1 where $R_1$ is an alkyl group having from about 10–16 carbon atoms.

5. A process of claim 1 where the alkyl monoester is hexadecyl hydrogen maleate.

6. A process of claim 1 where in the alkyl monoester is hexadecyl hydrogen fumarate.

7. A process of claim 1 where the alkyl monoester is hexadecyl hydrogen itaconate.

8. A process of claim 1 where about 40–200 parts of chlorine gas per hundred parts by weight of polyethylene is added to the aqueous suspension.

9. A process of claim 1 where the weight average molecular weight of the polyethylene is at least about 20,000.

* * * * *